(12) United States Patent
Kawamura et al.

(10) Patent No.: US 9,929,422 B2
(45) Date of Patent: Mar. 27, 2018

(54) MEMBRANE ELECTRODE ASSEMBLY AND METHOD OF PRODUCING THE MEMBRANE ELECTRODE ASSEMBLY

(71) Applicant: HONDA MOTOR CO., LTD., Tokyo (JP)

(72) Inventors: Yoshinori Kawamura, Tochigi-ken (JP); Satoshi Yonezawa, Utsunomiya (JP); Tomohide Shibutani, Utsunomiya (JP); Shunsuke Konishi, Saitama (JP); Takahiro Hirano, Utsunomiya (JP); Hiroshi Kurata, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 8 days.

(21) Appl. No.: 15/018,971

(22) Filed: Feb. 9, 2016

(65) Prior Publication Data

US 2016/0233533 A1 Aug. 11, 2016

(30) Foreign Application Priority Data

Feb. 10, 2015 (JP) ................................. 2015-024075

(51) Int. Cl.
*H01M 4/88* (2006.01)
*H01M 8/1004* (2016.01)
(Continued)

(52) U.S. Cl.
CPC ........... *H01M 8/1004* (2013.01); *B29C 41/02* (2013.01); *B29C 41/46* (2013.01); *B29C 69/00* (2013.01); *B32B 5/02* (2013.01); *B32B 9/007* (2013.01); *B32B 9/045* (2013.01); *B32B 27/08* (2013.01); *B32B 37/025* (2013.01); *B32B 37/06* (2013.01); *B32B 37/08* (2013.01);
*H01M 4/8642* (2013.01); *H01M 4/8663* (2013.01); *H01M 4/881* (2013.01); *B29C 41/12* (2013.01); *B29K 2105/0073* (2013.01);
(Continued)

(58) Field of Classification Search
None
See application file for complete search history.

(56) References Cited

U.S. PATENT DOCUMENTS

| 4,804,592 A | 2/1989 | Vanderborgh et al. |
| 2007/0078051 A1* | 4/2007 | Tamai ................. H01M 4/8642 502/101 |
| 2010/0051181 A1 | 3/2010 | Mori |

FOREIGN PATENT DOCUMENTS

| JP | 01-143151 | 6/1989 |
| JP | 2005-135787 | 5/2005 |

(Continued)

OTHER PUBLICATIONS

Japanese Office Action with partial English translation, dated Nov. 1, 2016, 4 pages.

*Primary Examiner* — Yoshitoshi Takeuchi
(74) *Attorney, Agent, or Firm* — Rankin, Hill & Clark LLP (57) ABSTRACT

In a membrane electrode assembly, electrode catalyst layers are provided respectively on both surfaces of an electrolyte membrane. Each of the electrode catalyst layers includes polymer electrolyte and catalyst. In each of the electrode catalyst layers, the weight of a component of the polymer electrolyte contained in one surface facing the electrolyte membrane is twice as large as, or more than twice as large as the weight of the component of the polymer electrolyte contained in another surface.

4 Claims, 8 Drawing Sheets

(51) Int. Cl.
*B29C 41/02* (2006.01)
*B29C 41/46* (2006.01)
*B29C 69/00* (2006.01)
*H01M 4/86* (2006.01)
*B32B 37/00* (2006.01)
*B32B 37/06* (2006.01)
*B32B 37/08* (2006.01)
*B32B 5/02* (2006.01)
*B32B 9/00* (2006.01)
*B32B 9/04* (2006.01)
*B32B 27/08* (2006.01)
*B29K 105/00* (2006.01)
*B29L 31/34* (2006.01)
*B29C 41/12* (2006.01)
*H01M 8/1018* (2016.01)
*B32B 38/10* (2006.01)
*B32B 37/24* (2006.01)
*B32B 38/16* (2006.01)

(52) U.S. Cl.
CPC ............. *B29K 2995/0005* (2013.01); *B29L 2031/3406* (2013.01); *B32B 38/10* (2013.01); *B32B 2037/243* (2013.01); *B32B 2038/168* (2013.01); *B32B 2255/10* (2013.01); *B32B 2262/106* (2013.01); *B32B 2264/00* (2013.01); *B32B 2307/724* (2013.01); *B32B 2457/18* (2013.01); *H01M 4/8814* (2013.01); *H01M 4/8828* (2013.01); *H01M 2008/1095* (2013.01); *Y02P 70/56* (2015.11)

(56) References Cited

FOREIGN PATENT DOCUMENTS

JP     2006-185800     7/2006
JP     2015-055922     3/2010

* cited by examiner

MEMBRANE ELECTRODE ASSEMBLY AND METHOD OF PRODUCING THE MEMBRANE ELECTRODE ASSEMBLY

CROSS-REFERENCE TO RELATED APPLICATION

This application is based upon and claims the benefit of priority from Japanese Patent Application No. 2015-024075 filed on Feb. 10, 2015, the contents of which are incorporated herein by reference.

BACKGROUND OF THE INVENTION

Field of the Invention

The present invention relates to a membrane electrode assembly including electrode catalyst layers provided respectively on both surfaces of an electrolyte membrane. Each of the electrode catalyst layers includes polymer electrolyte and catalyst. Further, the present invention relates to a method of producing the membrane electrode assembly.

Description of the Related Art

For example, generally, a solid polymer fuel cell is formed by stacking several tens to several hundreds of unit cells (power generation cells) together, and used as a fuel cell stack, e.g., mounted in a vehicle. Each of the unit cells is formed by sandwiching a membrane electrode assembly (MEA) between a pair of separators.

The membrane electrode assembly includes an electrolyte membrane, an anode facing one side of the electrolyte membrane, and a cathode facing the other surface of the electrolyte membrane. The membrane electrode assembly is a polymer electrolyte membrane. Each of the anode and the cathode includes an electrode catalyst layer facing the electrolyte membrane, and a gas diffusion layer facing the electrode catalyst layer. The electrode catalyst layer includes polymer electrolyte and catalyst, and serves as a reaction field for electrode reaction. A reactant gas is diffused, and supplied through the gas diffusion layer to the electrode catalyst layer.

As a method of producing such a membrane electrode assembly, for example a method using so called the decal method is known as shown in Japanese Laid-Open Patent Publication No. 2010-055922. Specifically, in this production method, catalyst ink is temporarily coated on a film like transfer base material to form a coating film. The coating film is dried, and solvent of the catalyst ink is evaporated to process the coating film into a dried film. Thereafter, the dried film is transferred to the electrolyte membrane to form an electrode catalyst layer.

SUMMARY OF THE INVENTION

As described in Japanese Laid-Open Patent Publication No. 2010-055922, the coating film is dried by transporting the transfer base material having the coating film into a drying furnace. However, if the coating film is dried by transporting the transfer base material into the drying furnace which is kept to have a certain internal temperature, defects such as cracks or fissures tend to occur in the front surface of the coating film (i.e., surface opposite to the surface where the coating film contacts the transfer base material). After the transfer from the dried film to the electrolyte membrane to form the electrode catalyst layer, this front surface faces the electrolyte membrane.

During operation of the fuel cell, since swelling/contraction of the electrolyte membrane occurs repeatedly, if defects are formed in the electrode catalyst layer, local stress tends to be applied to the electrolyte membrane easily. If the electrolyte membrane is damaged due to this stress, cross leakage or the like occurs, and consequently, the power generation efficiency and the durability of the fuel cell may be lowered undesirably.

A main object of the present invention is to provide a membrane electrode assembly having improved durability and power generation characteristics by suppressing the occurrence of cracks or fissures in the surface facing the electrolyte membrane of the electrode catalyst layer.

Another object of the present invention is to provide a method of producing the membrane electrode assembly.

According to one embodiment of the present invention, a membrane electrode assembly including electrode catalyst layers provided respectively on both surfaces of an electrolyte membrane is provided. Each of the electrode catalyst layers includes polymer electrolyte and catalyst. In each of the electrode catalyst layers, a weight of a component of the polymer electrolyte contained in one surface facing the electrolyte membrane is twice as large as, or more than twice as large as a weight of the component of the polymer electrolyte in another surface.

As a result of earnest studies of the inventors of the present application, it is found that, by changing the content weight of the component of the polymer electrolyte in the thickness direction of the electrode catalyst layer to satisfy the above relationship, it is possible to significantly reduce the rate (risk) of occurrence of defects such as cracks or fissures in the electrode catalyst layer. As described above, in the electrode catalyst layer having component of the polymer electrolyte deviated toward one surface facing the electrolyte membrane according to the present invention, it is possible to reduce the number of defects per unit area to $1/10$ or less in comparison with the case of the conventional structure.

Accordingly, even if swelling/contraction of the electrolyte membrane occurs repeatedly during operation of the fuel cell, it is possible to suppress the occurrence of local stress applied to the electrolyte membrane and the occurrence of cross leakage, etc. That is, by providing such an electrode catalyst layer, it is possible to improve the durability and the power generation characteristics of the membrane electrode assembly.

The invention also includes a production method for obtaining the above membrane electrode assembly. That is, according to one embodiment of the present invention, a method of producing a membrane electrode assembly including electrode catalyst layers provided respectively on both surfaces of an electrolyte membrane is provided. Each of the electrode catalyst layers includes polymer electrolyte and catalyst. The method includes the steps of mixing the polymer electrolyte, the catalyst, and solvent to prepare catalyst ink, coating the catalyst ink on a transfer base material to form a coating film, drying the coating film to obtain a dried film by heating the coating film from a base material side surface facing the transfer base material and cooling a front surface opposite to the base material side surface to maintain atmospheric temperature at the front surface, and transferring the dried film on the transfer base material to the electrolyte membrane by bringing the dried film into contact with the electrolyte membrane so as to provide the electrode catalyst layer on the electrolyte membrane, while a weight of a component of the polymer electrolyte contained in one surface facing the electrolyte membrane is twice as large as, or more than twice as large as a weight of the component of the polymer electrolyte contained in another surface. In the drying step, temperature of heating the base material side surface of the coating film is higher than atmospheric temperature at the front surface by 70° C. or more.

In the method of producing the membrane electrode assembly according to the present invention, as described above, it is possible to obtain the electrode catalyst layer in which occurrence of cracks or fissures is sufficiently suppressed. In this manner, it is possible to obtain the membrane electrode assembly with good durability and power generation characteristics.

In the above method of producing the membrane electrode assembly, in the drying step, preferably, a gas at normal temperature is blown toward the front surface of the coating film to maintain the atmospheric temperature. In this case, it becomes possible to maintain the atmospheric temperature easily at low cost without requiring any large scale equipment.

In the above method of producing the membrane electrode assembly, in the drying step, preferably, heating is performed by blowing hot wind to the base material side surface of the coating film through the transfer base material. In this case, it becomes possible to heat the coating film efficiently, and improve the productivity of the membrane electrode assembly.

In the above method of producing the membrane electrode assembly, in the drying step, by bringing the transfer base material into contact with a hot plate, the coating film may be heated from the base material side surface. In this case, it becomes possible to accurately control the temperature for heating the coating film, and it becomes possible to obtain the electrode catalyst layer in which cracks and fissures are suppressed further effectively.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, a preferred embodiment of a membrane electrode assembly according to the present invention, and a method of producing the membrane electrode assembly will be described in detail with reference to the accompanying drawings.

The membrane electrode assembly according to the embodiment of the present invention forms a unit cell of a solid polymer electrolyte fuel cell, for example. That is, normally, the fuel cell is formed by stacking several tens to several hundreds of unit cells together. Each of the unit cells is formed by sandwiching the membrane electrode assembly between a pair of separators.

Figure 1:
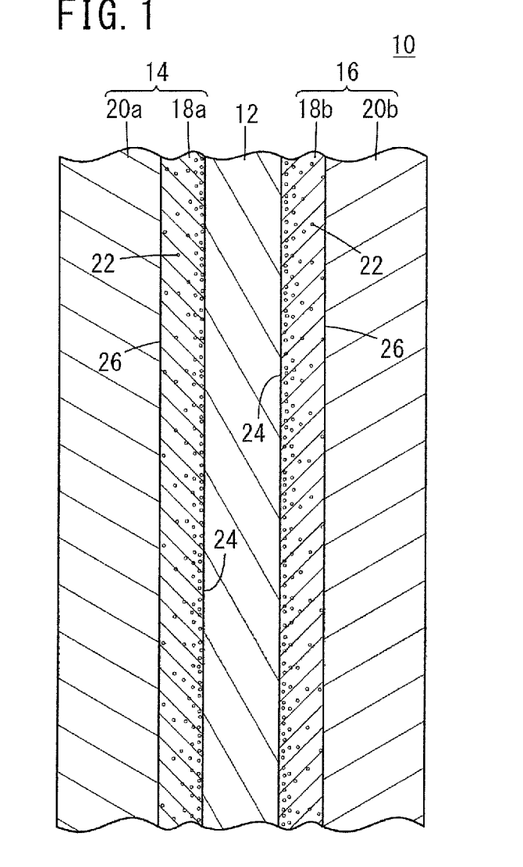
FIG. 1 is a cross sectional view showing main components of a membrane electrode assembly according to an embodiment of the present invention.

A membrane electrode assembly 10 according to the embodiment of the present invention will be described with reference to FIG. 1. The membrane electrode assembly 10 includes an anode 14, a cathode 16, and an electrolyte membrane 12 interposed between the anode 14 and the cathode 16. For example, polymer which belongs to cation exchange resin and has proton conductivity in a form of a film is used as the electrolyte membrane 12. As the cation exchange resin, for example, sulfonated compound of vinyl polymer such as polystyrene sulfonic acid, perfluoroalkylsulfonic acid polymer, perfluoroalkylcarboxylic acid polymer, polymer obtained by introducing a sulfonate group or a phosphate group into heat resistant high molecule of polybenzimidazole, polyether ether ketone, etc., or polymer chiefly containing rigid polyphenylene obtained by polymerization of aromatic compound composed of a phenylene chain and a sulfonate group introduced into the same may be used.

The anode 14 includes an electrode catalyst layer 18a facing the electrolyte membrane 12, and a gas diffusion layer 20a facing the electrode catalyst layer 18a. The electrode catalyst layer 18a is formed by containing catalyst particles supporting catalyst metal such as platinum on a catalyst support such as carbon black, and as a polymer electrolyte, a polymer of the same kind as the one used in the electrolyte membrane 12. The electrode catalyst layer 18a serves as a reaction field for electrode reactions. It should be noted that catalyst particles only including particles of catalyst metal without including any catalyst support (e.g., platinum black) may be adopted instead of the above catalyst particles.

Further, in this electrode catalyst layer 18a, the weight of the component 22 of the solid polymer electrolyte contained in one surface 24 facing the electrolyte membrane 12 is twice as large as, or more than twice as large as the weight of the component 22 of the solid polymer electrolyte contained in another surface 26.

For example, the gas diffusion layer 20a is made of a carbon paper. A reactant gas is diffused, and supplied through the gas diffusion layer 20a to the electrode catalyst layer 18a.

As in the case of the anode 14, the cathode 16 includes an electrode catalyst layer 18b and a gas diffusion layer 20b. The electrode catalyst layer 18b may have substantially the same structure as the electrode catalyst layer 18a except the catalyst contents, etc., in these layers. That is, also in the electrode catalyst layer 18b, the weight of the component 22 of the polymer electrolyte contained in one surface 24 facing the electrolyte membrane 12 is twice as large as, or more than twice as large as the weight of the component 22 of the polymer electrolyte contained in the other surface 26.

Further, the gas diffusion layer 20b may have substantially the same structure as the gas diffusion layer 20a. In the following description, it should be noted that the electrode catalyst layers 18a, 18b are also referred to as the electrode catalyst layer, collectively. Further, the gas diffusion layers 20a, 20b are also referred to as the gas diffusion layer, collectively.

Figure 2:
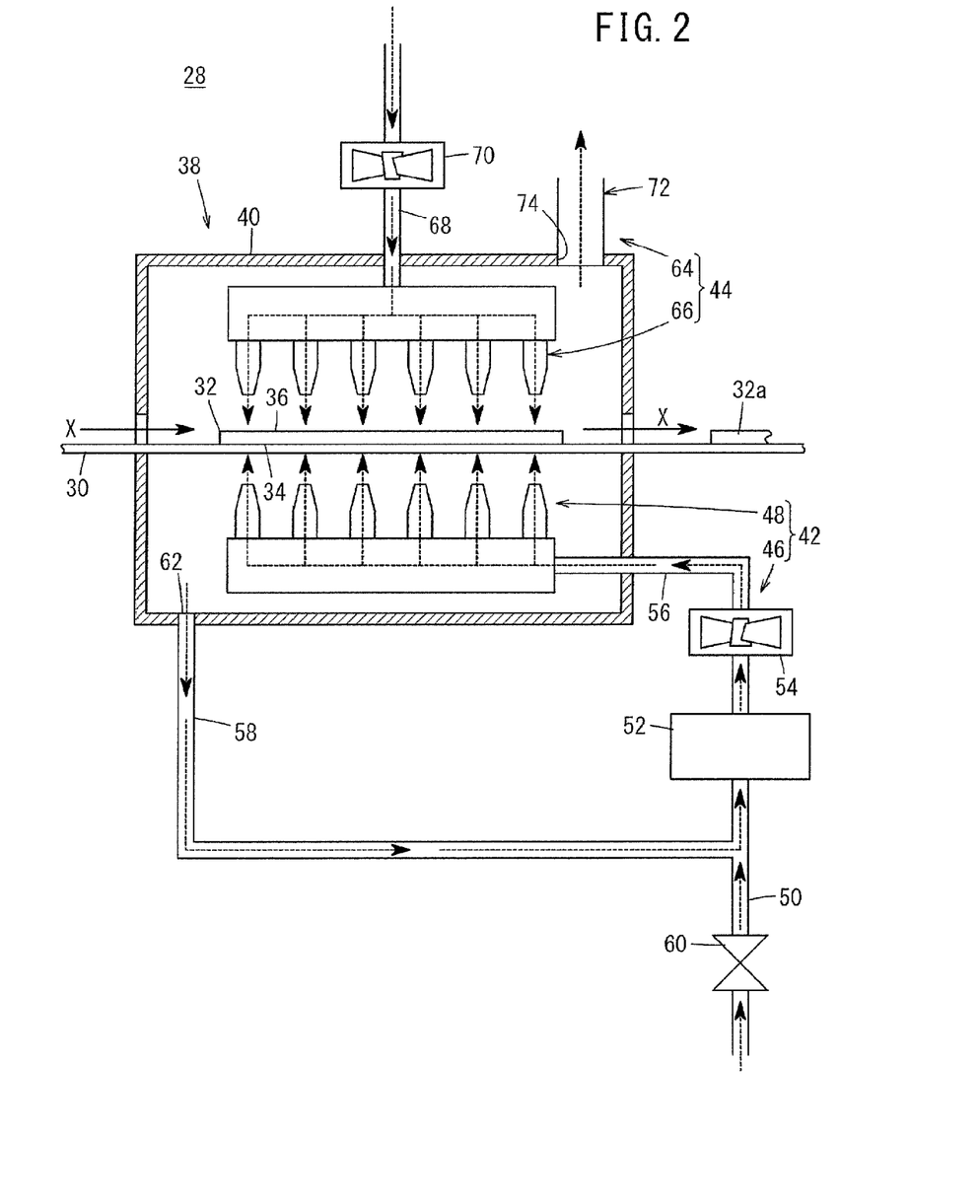
FIG. 2 is a schematic view showing a dryer device for carrying out a method of producing the membrane electrode assembly according to the embodiment of the present invention.

A method of producing the membrane electrode assembly 10 basically having the above structure will be described with reference to FIG. 2, in connection with a case of using a dryer device 28 described later to carry out this method, as an example.

At the time of producing the membrane electrode assembly 10, firstly, a polymer is selected from the above polymers which belong to cation exchange resin and has proton conductivity. The polymer in a form of a rectangular sheet is used to prepare the electrolyte membrane 12. The electrode catalyst layer 18a is formed on one surface of the electrolyte membrane 12, and the electrode catalyst layer 18b is formed on the other surface of the electrolyte membrane 12.

Specifically, a mixing step of mixing the above described polymer electrolyte and catalyst particles, and organic solvent such as, for example, ethanol, propanol, ethylene glycol, etc. is performed to prepare catalyst ink.

Next, a coating step of forming a coating film 32 by coating predetermined quantity of the catalyst ink on a transfer base material 30 is performed. The transfer base material 30 has a film shape, and formed by PTFE, etc. In this regard, a surface of the coating film 32 facing the transfer base material 30 is referred to as a base material side surface 34, and a surface of the coating film 32 opposite to (on the backside of) the base material side surface 34 is referred to as a front surface 36.

Next, a drying step of drying the coating film 32 to obtain a dried film 32a is performed. In this drying step, the coating film 32 is heated from the base material side surface 34, and the front surface 36 is cooled to maintain the atmospheric temperature at the front surface 36. This drying step is performed to maintain a state where the heating temperature T1 of the base material side surface 34 of the coating film 32 is higher than the atmospheric temperature T2 at the front surface 36 by 70° C. or more, and the atmospheric temperature T2 is 65° C. or less. For example, the drying step can be performed using the dryer device 28.

Specifically, the dryer device 28 has a drying furnace 38 for drying the coating film 32. Further, the dryer device 28 has transportation means (not shown) such as transportation rolls for allowing the transfer base material 30 and the coating film 32 to move in a direction indicated by an arrow X in FIG. 2, and pass through the drying furnace 38.

The drying furnace 38 includes a drying furnace main body 40, heating means 42, and cooling means 44. That is, in the drying furnace main body 40, the heating means 42 is provided for allowing the base material side surface 34 of the coating film 32 to be heated by the heating means 42 through the transfer base material 30. Further, the cooling means 44 is provided for allowing the front surface 36 of the coating film 32 to be cooled by the cooling means 44.

The heating means 42 includes a hot wind generating section 46 for generating hot wind, a plurality of hot wind nozzles 48 for blowing hot wind from the hot wind generation section 46 toward the transfer base material 30. The hot wind generating section 46 includes a first pipe 50, a heater 52, a circulating fan 54, a second pipe 56, a third pipe 58, and a valve 60. In the structure, for example, the air supplied through an air supply fan (not shown) is supplied to the heater 52 through the first pipe 50. The air is heated by the heater 52 to generate hot wind.

By operation of the circulating fan 54, the generated hot wind is supplied to the hot wind nozzles 48 through the second pipe 56. In this manner, the coating film 32 can be heated from the base material side surface 34 by blowing the hot wind from the hot wind nozzles 48 to the coating film 32.

The hot wind supplied from the hot wind nozzles 48 to the drying furnace main body 40 in the manner described above flows from a gas discharge port 62 in the drying furnace main body 40 into the third pipe 58. At this time, by adjusting the opening angle of the valve 60, after the hot wind is used for heating the coating film 32 in the drying furnace main body 40, the hot wind can be supplied again from the third pipe 58 to the first pipe 50. That is, it is possible to reuse hot wind in the hot wind generating section 46 and circulate the hot wind, and thus, reduce the energy required for generating the hot wind.

The temperature of the hot wind blown out of the hot wind nozzles 48, i.e., the heating temperature T1 can be adjusted by the heater 52. For example, the heating temperature T1 should be adjusted in a rage of 100 to 150° C. Further, the hot wind generating section 46 may have a dumper (not shown) or the like, for adjusting the flow rate of hot air supplied from the hot wind nozzles 48 to the drying furnace main body 40.

The cooling means 44 cools the front surface 36 of the coating film 32 to suppress the increase in the atmospheric temperature T2. Therefore, the atmospheric temperature T2 is maintained at 65° C. or less. This cooling means 44 includes a gas supply/discharge section 64 for supplying a gas at normal temperature, e.g., atmospheric air, into the drying furnace main body 40, and a plurality of cooling nozzles 66 for blowing the atmospheric air toward the front surface 36 of the coating film 32. The gas supply/discharge section 64 includes a fourth pipe 68, an air supply fan 70, and a fifth pipe 72. By operation of the air supply fan 70, the atmospheric air supplied to the fourth pipe 68 is supplied to the cooling nozzles 66. In the structure, by blowing the atmospheric air from the cooling nozzles 66 to the front surface 36 of the coating film 32, the atmospheric temperature T2 at the front surface 36 can be maintained within the above range. Further, at this time, the relationship between the heating temperature T1 and the atmospheric temperature T2 is determined such that the temperature difference between the heating temperature T1 and the atmospheric temperature T2 becomes 70° C. or more.

The atmospheric air supplied from the cooling nozzles 66 into the drying furnace main body 40 in this manner flows from a gas discharge port 74 provided in the drying furnace main body 40 into the fifth pipe 72, and the atmospheric air is discharged. In this regard, valves or circulating fans (not shown) may be provided for the fifth pipe 72, for adjusting the quantity of the discharged atmospheric air.

As described above, by performing the drying step using the dryer device 28, it is possible to move the component 22 of the polymer electrolyte from the base material side surface 34 toward the front surface 36, and dry the coating film 32. Consequently, it is possible to easily obtain a dried film 32a in which the weight of the component 22 of the polymer electrolyte at the front surface 36 is twice as large as, or more than twice as large as the weight of the component 22 of the polymer electrolyte at the base material side surface 34.

Next, a transfer step is performed, in which the transfer base material 30 is adhered to the electrolyte membrane 12 by heat such that the front surface 36 of this dried film 32a contacts one surface of the electrolyte membrane 12, and then the transfer base material 30 is peeled. Therefore, the dried film 32a is transferred to the electrolyte membrane 12 to provide the electrode catalyst layer 18a. In this regard, as described above, the surface which was the front surface 36 of the dried film 32a (coating film 32) becomes one surface 24 of the electrode catalyst layer. Further, the surface which was the base material side surface 34 of the dried film 32a (coating film 32) becomes the other surface 26 of the electrode catalyst layer.

Also on the part of the other surface of the electrolyte membrane 12, the dried film 32a formed by performing the same steps as described above may be transferred to provide the electrode catalyst layer 18b.

By the above steps, it is possible to obtain the membrane electrode assembly 10 including the electrode catalyst layers 18a, 18b provided respectively on both surfaces 24, 26 of the electrolyte membrane 12. In each of the electrode catalyst layers 18a, 18b, the weight of the component 22 of the polymer electrolyte changes in the thickness direction of the electrode catalyst layer as described above.

That is, it is possible to obtain the membrane electrode assembly 10 including the electrode catalyst layers in which the weight of the component 22 of the polymer electrolyte contained in the one surface 24 is twice as large as, or more than twice as large as the component 22 of the polymer electrolyte contained in the other surface 26.

In this membrane electrode assembly 10, as described later, the number of defects per unit area of the electrode catalyst layer is reduced to 1/10 or less. Accordingly, even if swelling/contraction of the electrolyte membrane 12 occurs during operation of the fuel cell, it is possible to suppress the occurrence of local stress in the electrolyte membrane 12, and the occurrence of cross leakage, etc. That is, by providing such electrode catalyst layers, it is possible to improve the durability and the power generation characteristics of the membrane electrode assembly 10.

Further, in the method of producing this membrane electrode assembly 10, as described above, the atmospheric temperature T2 is maintained by blowing air (atmospheric air) at normal temperature toward the front surface 36 of the coating film 32. Accordingly, it is possible to maintain the atmospheric temperature T2 easily at low cost without requiring any large scale equipment.

Further, in the above drying step, by blowing hot wind to the transfer base material 30, the coating film 32 is heated from the base material side surface 34. Accordingly, it becomes possible to heat the coating film 32 efficiently, and improve the productivity of the membrane electrode assembly 10.

The present invention is not limited to the above described embodiment specially, and various modifications can be made without departing from the gist of the present invention.

For example, in the method of producing the membrane electrode assembly 10 according to the above described embodiment, hot wind is blown to the transfer base material 30 to heat the coating film 32 from the base material side surface 34. However, as long as it is possible to heat the base material side surface 34 of the coating film 32, the above structure may not be adopted essentially. For example, the coating film 32 may be heated by bringing the transfer base material 30 into contact with a hot plate (not show).

In this case, it is possible to accurately control the heating temperature T1 of the coating film 32, and obtain the electrode catalyst layer in which cracks or fissures are suppressed further effectively.

Embodiment Example

In the method of producing the membrane electrode assembly 10, the mixing step, the coating step, and the drying step were performed to form the coating film 32 on the transfer base material 30, and obtain a sample S1 according to an embodiment example.

Specifically, firstly, as polymer electrolyte, DuPont's Nafion (Product Name), which includes fluorine (F) as its component, was adopted. Further, as catalyst, platinum supporting carbon was adopted. Further, catalyst ink was obtained by mixing these materials with alcohol as organic solvent in a manner that the weight ratio of catalyst to the polymer electrolyte becomes 0.1, to obtain catalyst ink.

Next, the catalyst ink was coated onto the transfer base material 30 of a PTFE sheet to form the coating film 32.

Next, the surface of the transfer base material 30 without the coating film 32 was placed on a hot plate to heat the base material side surface 34 through the transfer base material 30. At the same time, a gas at normal temperature was blown to the front surface 36 of the coating film 32 for cooling, to maintain the atmospheric temperature T2. In this manner, the coating film 32 was dried to form the dried film 32a. The heating temperature T1 was 110° C., and the atmospheric temperature T2 was 30° C. That is, the temperature difference between the heating temperature T1 and the atmospheric temperature T2 was 80° C.

By forming the dried film 32a on the transfer base material 30 in this manner, the sample S1 according to the embodiment example was prepared.

Further, for comparison, a sample S2 according to a comparative example was prepared in the same manner as in the case of the sample S1 except that, instead of the above drying step, the transfer base material 30 having the coating film 32 was placed in a drying furnace (atmospheric temperature 120° C.) for drying the coating film 32 to produce the dried film 32b.

For each of these samples S1 and S2, after the dried films 32a, 32b of the transfer base material 30 were embedded in epoxy resin solution, the samples S1, S2 were defoamed, the epoxy resin was hardened, and then, SEM observation was performed. A photo of the sample S1 observed by SEM is shown in FIG. 3, and a photo of the sample S2 observed by SEM is shown in FIG. 5.

Figure 6A:
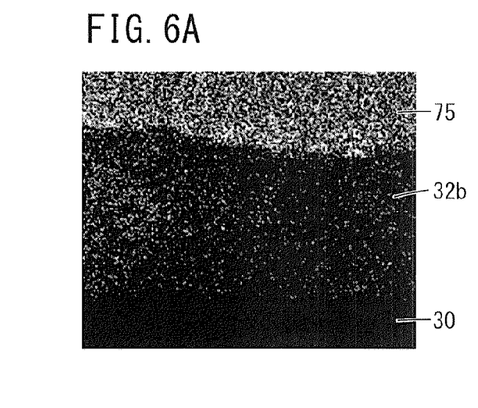
FIG. 6A is a view showing a measurement result of mapping of carbon (C) for the sample S2.
Figure 6B:
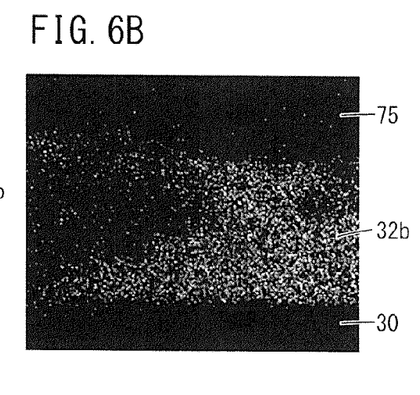
FIG. 6B is a view showing a measurement result of mapping of fluorine (F) for the sample S2.
Figure 6C:
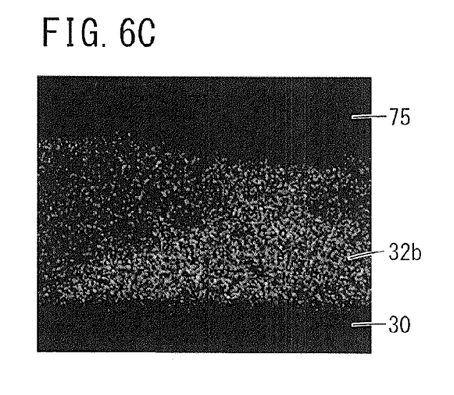
FIG. 6C is a view showing a measurement result of mapping of Pt (platinum) for the sample S2.

Further, for each of these SEM observation images, composition mapping by an energy dispersive X-ray spectrometry (EDX) device was performed, and distributions of carbon (C), fluorine (F), and platinum (Pt) were checked. The results of the sample S1 are shown in FIGS. 4A, 4B, and 4C, and the results of the sample S2 are shown in FIGS. 6A, 6B, and 6C. FIG. 4A and FIG. 6A show measurement results of C in the samples S1, S2, FIG. 4B and FIG. 6B show measurement results of F (component 22 of the polymer electrolyte) in the samples S1, S2, and FIG. 4C and FIG. 6C show measurement results of Pt in the samples S1, S2. As described above, a reference numeral 75 in FIG. 3 to FIG. 6C denotes embedded resin for SEM observation as described above.

Figure 3:
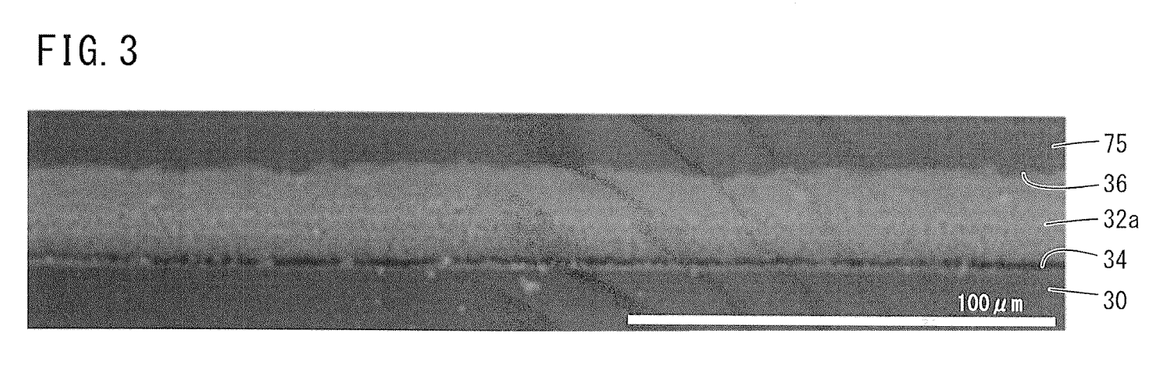
FIG. 3 is a photo of a sample S1 according to an embodiment example observed by SEM.
Figure 4A:
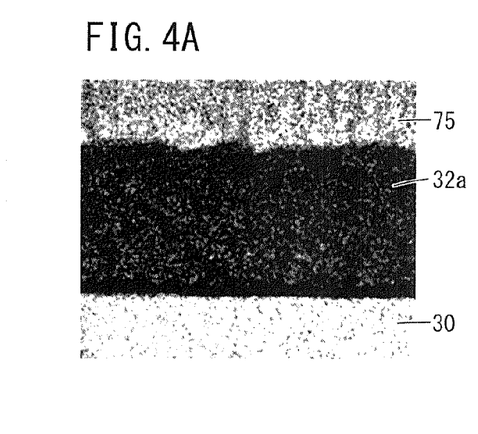
FIG. 4A is a view showing a measurement result of mapping of carbon (C) for the sample S1.
Figure 4B:
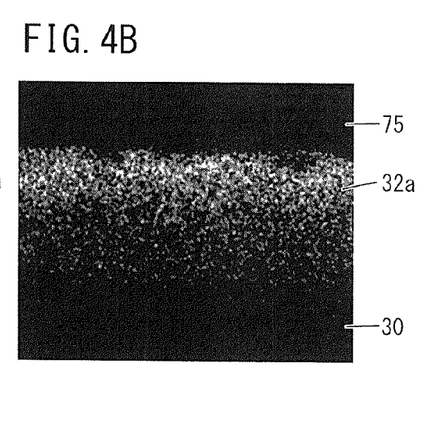
FIG. 4B is a view showing a measurement result of mapping of fluorine (F) for the sample S1.
Figure 4C:
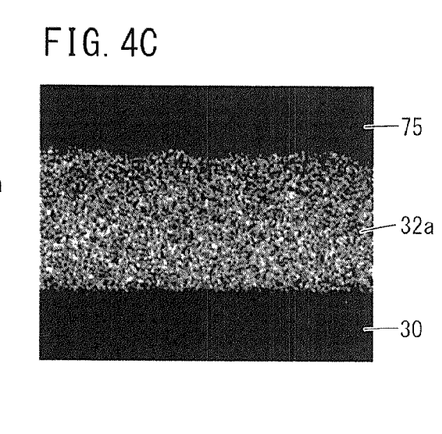
FIG. 4C is a view showing a measurement result of mapping of Pt (platinum) for the sample S1.
Figure 5:
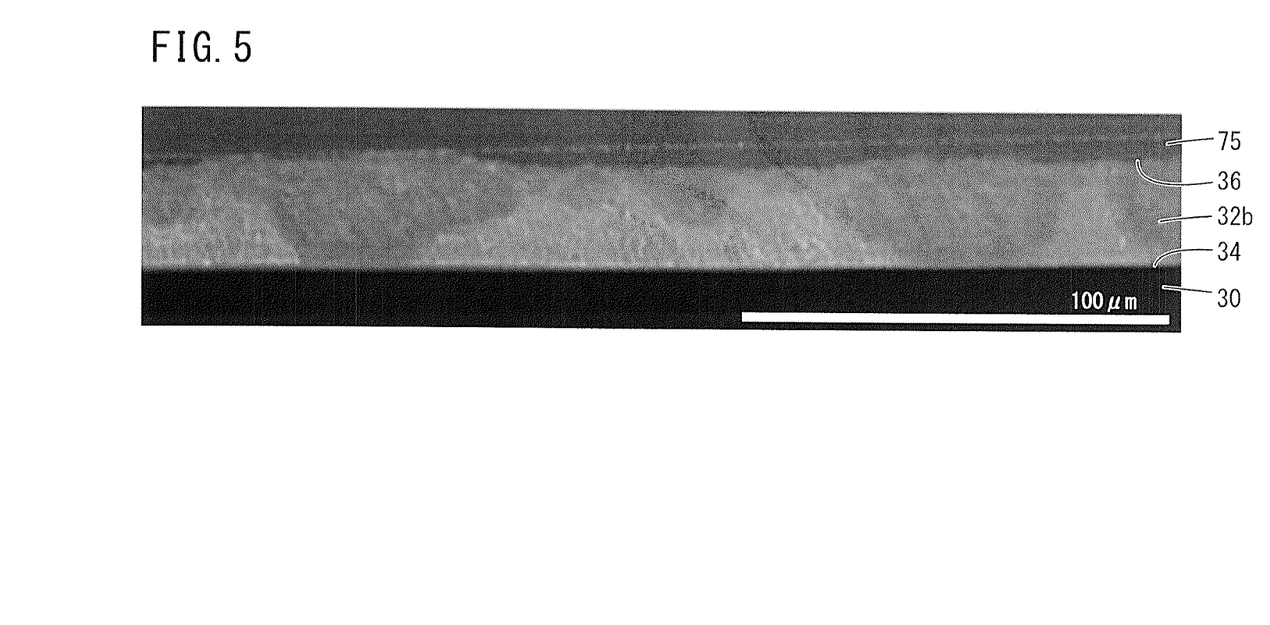
FIG. 5 is a photo of a sample S2 according to a comparative example observed by SEM.

As can be seen from FIGS. 3 and 5, in the sample S2 according to the comparative example, the composition in the dried film 32b is non-uniform, and in the sample S1 according to the embodiment example, the composition in the dried film 32a is substantially uniform.

Further, as can be seen from FIG. 6A to FIG. 6C, in the sample. S2 according to the comparative example, in particular, F as the component 22 of polymer electrolyte in the dried film 32b is distributed non-uniformly. In contrast, as can be seen from FIG. 4A to 4C, in the sample S1 according to the embodiment example, F in the dried film 32a is distributed with deviation toward the front surface 36.

In this regard, C is distributed substantially uniformly in the dried film 32a of the sample S1. Therefore, for comparison of the content weight ratios of F, using C as a reference, the weight ratios of F relative to C is determined for each of the entire dried film 32a, the front surface 36 of the dried film 32a, and the base material side surface 34 of the dried film 32a. That is, the weight ratio is 2 in the entire dried films 32a, the weight ratio is in a range of 2.8 to 3.4 in the front surface 36 of the dried films 32a, and the weight ratio is in a range of 0.6 to 1.2 in the base material side surface 34. Therefore, assuming that the weight ratio in the entire dried films 32a is 100%, the weight ratio in the front surface 36 is in a range of 140 to 170%, and the weight ratio in the base material side surface 34 is in a range of 30 to 60%.

In consideration of the above results, it was confirmed that, in the dried film 32a of the sample S1, the weight of the component 22 of the polymer electrolyte contained in the front surface 36 is twice as large as, or more than twice as large as the weight of the component 22 of the polymer electrolyte contained in the base material side surface 34. As described above, the front surface 36 and the base material side surface 34 of the dried film 32a correspond respectively to one surface 24 and the other surface 26 facing the electrolyte membrane 12 of the electrode catalyst layer. In view of the above, in the case where the heating temperature T1 is higher than the atmospheric temperature T2 by 70° C. or more, it is clear that the weight of the component 22 of the polymer electrolyte facing one surface 24 of the electrode catalyst layer becomes twice as large as, or more than twice as large as the weight of the component 22 of the polymer electrode facing the other surface 26 of the electrode catalyst layer.

As can be seen from FIG. 4A to 4C and FIG. 6A to FIG. 6C, it can be said that Pt as a component of catalyst in the dried films 32a, 32b is also distributed uniformly in the case of the sample S1 according to the embodiment example, in comparison with the sample S2 according to the comparative example.

Next, samples A and B according to the embodiment example and samples C and D according to the comparative example were prepared in the same manner as in the case of the sample S1 according to the embodiment example, except that the heating temperature T1 and the atmospheric temperature T2 are different. That is, in the samples A to D, the heating temperature T1 is 130° C. In the sample A, the atmospheric temperature T2 is 50° C., in the sample B, the atmospheric temperature T2 is 60° C., in the sample C, the atmospheric temperature T2 is 70° C., and in the sample D, the atmospheric temperature T2 is 80° C. Therefore, the temperature difference between the heating temperature T1 and the atmospheric temperature T2 in the samples A to D are 80° C., 70° C., 60° C., and 50° C., respectively.

Figure 7:
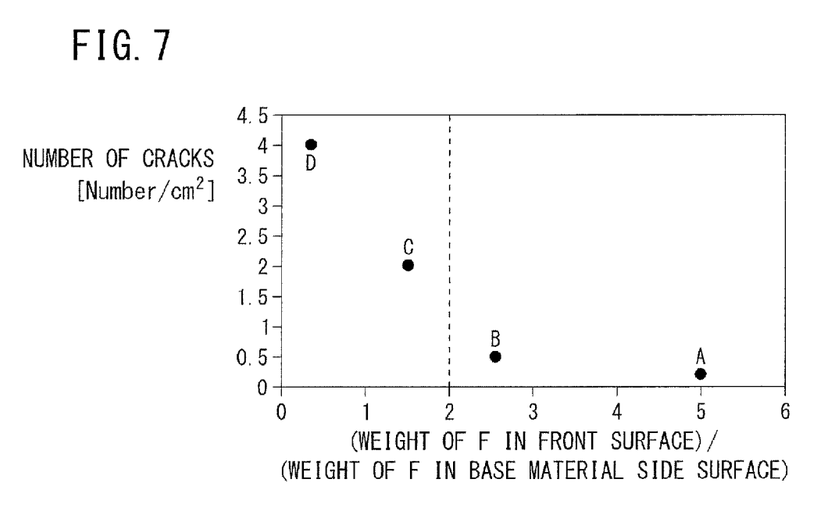
FIG. 7 is a graph showing the relationship between the ratio of the weight of F in the base material side surface to the weight of F in the front surface and the number of cracks per unit area (number/$cm^2$), for samples A and B according to embodiment examples and samples C and D according to comparative examples.

For each of these samples A to D, the weight ratio of F contained in the base material side surface 34 relative to F contained in the front surface 36 and the number of cracks formed in the front surface 36 were measured to determine the number of cracks per unit area (number/cm$^2$). FIG. 7 is a graph showing the relationship between these values for these samples A to D.

Figure 8:
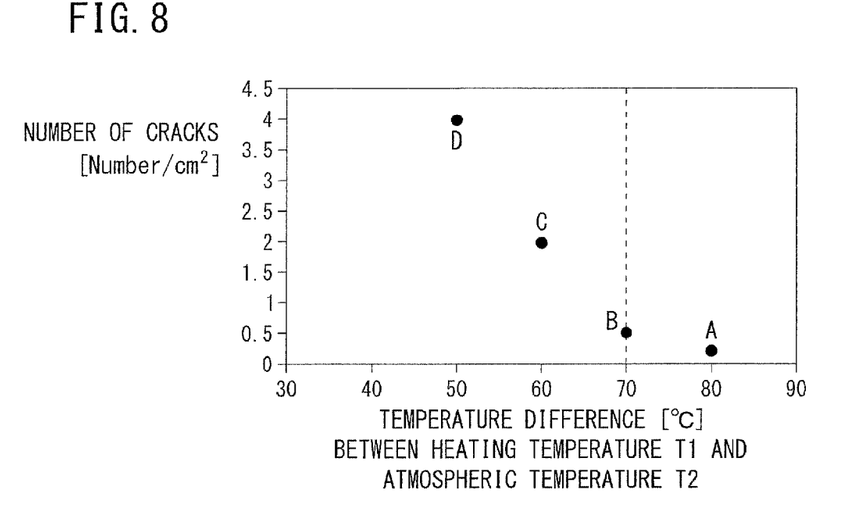
FIG. 8 is a graph showing the relationship between the temperature difference between the heating temperature at the base material side surface and the atmospheric temperature at the front surface, and the number of cracks (number/$cm^2$) per unit area, for the samples A to D.

Further, FIG. 8 is a graph showing the relationship between the temperature difference between the heating temperature T1 and the atmospheric temperature T2, and the number of cracks per unit area (number/cm$^2$) for these samples A to D.

As can be seen from FIGS. 7 and 8, the number of cracks formed per unit area in the front surface 36 of the samples A and B according to the embodiment example is 1/10 or less in comparison with the cases of the samples C and D according to the comparative example. That is, in the case where the weight of the component 22 of the polymer electrolyte contained in the front surface 36 is twice as large as, or more than twice as large as the weight of the component 22 of the polymer electrolyte contained in the base material side surface 34, it is possible to significantly reduce the rate of occurrence of defects such as cracks or fissures in the electrode catalyst layer.

Further, in the drying step, in the case where the heating temperature T1 is higher than the atmospheric temperature T2 by 70° C. or more, it is possible to significantly reduce the rate of occurrence of defects such as cracks or fissures in the electrode catalyst layer.

While the invention has been particularly shown and described with reference to preferred embodiments, it will be understood that variations and modifications can be effected thereto by those skilled in the art without departing from the scope of the invention as defined by the appended claims.

What is claimed is:

1. A method of producing a membrane electrode assembly comprising electrode catalyst layers provided respectively on both surfaces of an electrolyte membrane, the electrode catalyst layers each including polymer electrolyte and catalyst, the method comprising the steps of:

mixing the polymer electrolyte, the catalyst, and solvent to prepare catalyst ink;

coating the catalyst ink on a transfer base material to form a coating film;

simultaneously heating and cooling the coating film for drying the coating film to obtain a dried film, wherein the coating film is heated from a base material side surface facing the transfer base material and cooled at a front surface opposite to the base material side surface such that a temperature at the front surface is kept unchanged, and wherein the coating film is simultaneously heated and cooled until a weight of a component in the polymer electrolyte at the front surface is at least twice as large as a weight of the component in the polymer electrolyte at the base material side surface; and bringing a front surface of the dried film formed on the transfer base material into contact with the electrolyte membrane, the front surface of the dried film corresponding to the front surface of the coating film, and transferring the dried film to the electrolyte membrane so as to provide on at least one of the surfaces of the electrolyte membrane, an electrode catalyst layer having the weight of the component of the polymer electrolyte at the front surface facing the electrolyte membrane at least twice as large as the weight of the component of the polymer electrolyte at the surface opposite to the front surface, as at least one of the electrode catalyst layers,
wherein temperature of heating the base material side surface of the coating film is higher than the temperature at the front surface by 70° C. or more.

2. The method of producing the membrane electrode assembly according to claim 1, wherein a gas is blown toward the front surface of the coating film to maintain the temperature at the front surface.

3. The method of producing the membrane electrode assembly according to claim 1, wherein heating is performed by blowing hot wind to the base material side surface of the coating film through the transfer base material.

4. The method of producing the membrane electrode assembly according to claim 1, wherein by bringing the transfer base material into contact with a hot plate, the coating film is heated from the base material side surface.

* * * * *